No. 777,382. PATENTED DEC. 13, 1904.
V. LE BEAU.
BAIT HOLDER AND FISH DECOY.
APPLICATION FILED JULY 27, 1904.
NO MODEL.
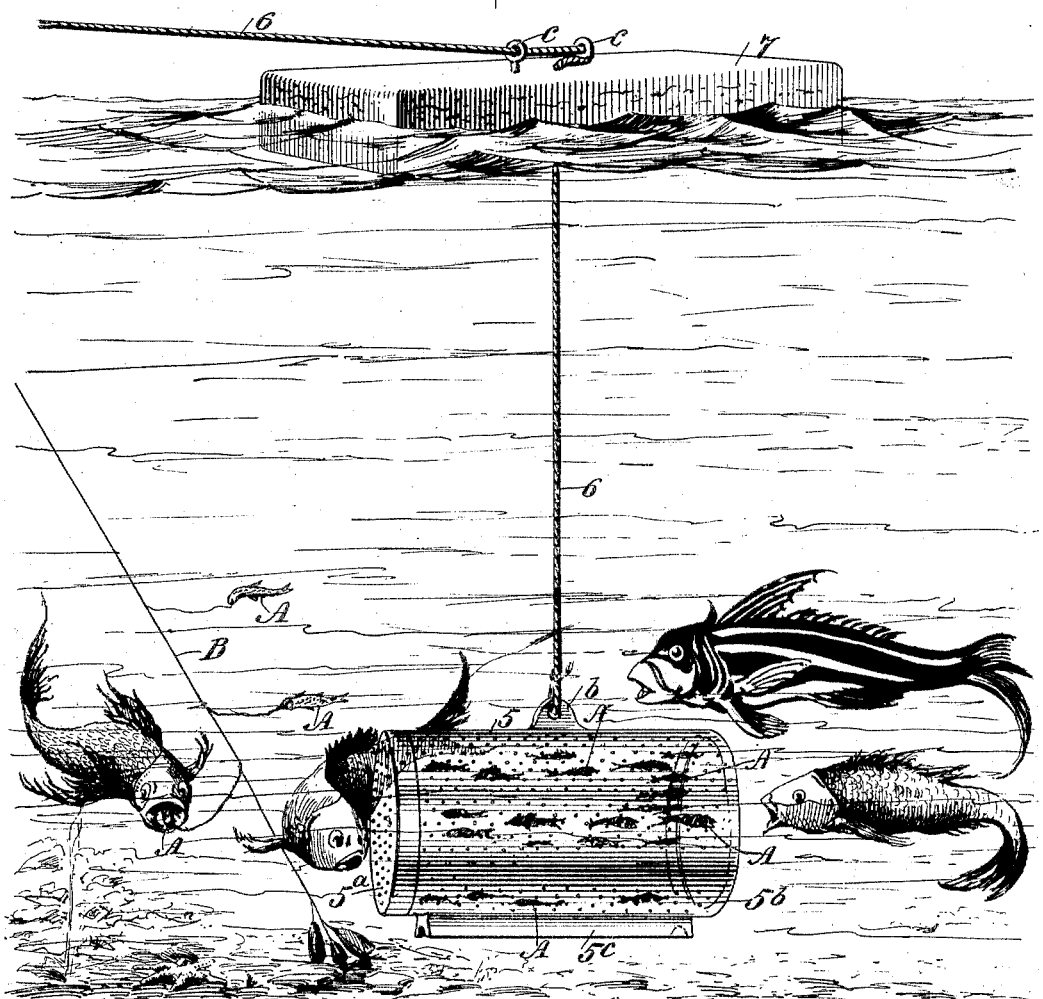
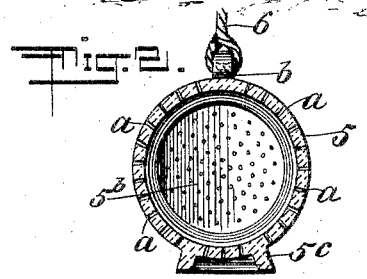
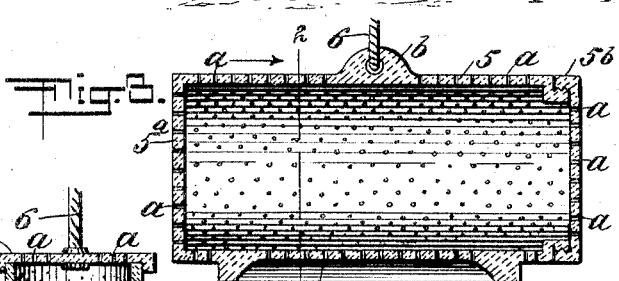
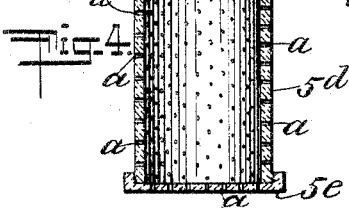
WITNESSES:
INVENTOR
Victor Le Beau
BY Munn & Co
ATTORNEYS No. 777,382.  
Patented December 13, 1904.

UNITED STATES PATENT OFFICE.

VICTOR LE BEAU, OF NEW ORLEANS, LOUISIANA.

BAIT-HOLDER AND FISH-DECOY.

SPECIFICATION forming part of Letters Patent No. 777,382, dated December 13, 1904.

Application filed July 27, 1904. Serial No. 218,370. (No model.)

*To all whom it may concern:*

Be it known that I, VICTOR LE BEAU, a citizen of the United States, and a resident of New Orleans, in the parish of Orleans and State of Louisiana, have invented a new and Improved Bait-Holder and Fish-Decoy, of which the following is a full, clear, and exact description.

The object of this invention is to provide a transparent holder for live bait, such as small fish, which will serve to expose the bait when suspended in a body of water and allure large fish, so that they may be taken on lines and hooks that are baited and lowered in the water near the decoy or bait-holder.

The invention consists in the novel construction and combination of parts, as is hereinafter described, and defined in the subjoined claims.

Reference is to be had to the accompanying drawings, forming a part of this specification, in which similar characters of reference indicate corresponding parts in all the figures.

Figure 1 is a perspective view of the improvement applied for service. Fig. 2 is a transverse sectional view substantially on the line 2 2 in Fig. 3. Fig. 3 is a sectional side view taken through the longitudinal axis of the bait-holder, and Fig. 4 is a longitudinal sectional view of a modified form of the bait-holder.

There are different species of edible fish—such as sea-bass, salmon, and pickerel—that inhabit salt and fresh water which are attracted by small live fish that they prefer as food, and to obtain minnows, shrimps, or the like such game-fish will pursue them into shallow water, where the small fish abound in shoals. In view of the habit of many kinds of edible fish to seek live food of the character mentioned where the small fish are plentiful I have devised the present improved bait-holder, wherein small bait-fish may be kept alive in the water and be fully exposed to view of game-fish that sportsmen prefer to capture with line and hook, not only for profit, but also for the exciting pleasure of taking them in that way.

Referring to the drawings, that show the construction and use of the improved bait-holder and fish-decoy, 5 indicates the body of the bait-holder, which preferably is in the form of a cylinder that for convenience in manufacture and to render it transparent may be blown or molded from molten glass. One end wall, $5^a$, of the cylindrical bait-holder body 5 may be formed integral therewith, and the other end be provided with a removable cover $5^b$, that may be screwed thereon, as shown, or be detachably connected therewith by any other available means, and it is to be understood that if in manufacture it is found to be of advantage both end walls of the body of the holder may be rendered removable and readily securable in place thereon. The holder-body 5 is of such dimensions as will permit the same to receive a desired number of bait-fish A and allow space for the natural movement of such small fish in the water that fills the holder, and to facilitate the free circulation of water in and through the bait-holder the side and end walls of the same are numerously perforated, as shown at $a$ in the drawings. Upon one side of the holder side wall 5 a projecting ledge $5^c$ may be formed, this ledge, that is rectangular, affording a foot-piece whereon the bait-holder may be rested when it seats upon a support, such as the bottom of a body of water or a level fixture in a boat. Opposite the foot-piece $5^c$ and at the longitudinal center of the holder-body 5 an ear $b$ projects therefrom, having a transverse perforation in it for the reception of an end portion of a rope or cord 6, that is thereto secured. A float 7, that may be a block of cork or light dry wood, is connected with the bait-holder by means of the cord 6, that may pass therethrough upwardly and on the top of the float engage with ring-eyes $c$, which support the cord and permit its lateral extension to a boat (not shown) wherein the fisherman is seated.

In use the bait-holder, having been supplied with the number of bait-fish it is to carry, is lowered to a proper depth in the water where the fish to be captured are usually found, the depth of submergence being regulated by securing the cord from slipping through the float 7 at a suitable point, this depth being such as will conform with the habit of the fish to be taken, as some will bite at bait near the surface of the water and others will only take the bait in deep water. As the glass body of the bait-holder is practically invisible when in the water, assuming that it is formed of clear transparent glass, the bait-fish A in it will be clearly exposed to the view of the larger fish that will be attracted to them and endeavor to feed on them. After waiting a reasonable time to permit the bait-fish in the holder to allure the game-fish, the fisherman, having live bait A on the hook or hooks, casts his line B, with the baited hook or hooks on it, near to the bait-holder, and as the fish that are near the bait-holder are eager for live food one may take the bait on a hook and strive to get away, thus giving the fisherman the sport of playing the fish and eventually capturing it. At any time it is desired to renew the bait on the hooks the fisherman approaches the float 7 and draws the submerged bait-holder to the surface of the water, and after removing such bait as is needed recloses the holder, which is let sink for the repetition of the decoying operation.

In Fig. 4 the form of the bait-holder is slightly modified, as there are two removable end walls 5$^e$ provided, both perforated, as well as the body of the holder, for the free circulation of water therethrough; but in this construction the cord 6 is attached to the center of one end wall and thence may be extended to engage with the float 7, as before explained, this form of the improvement being practically the same as that hereinbefore described.

It is to be understood that any transparent material may be employed—as, for example, lucid mica may in sheets be used in place of glass and held by suitable means—and the shape of the bait-holder may also be changed within the scope of my invention. Hence I do not confine the construction of the improvement to the exact forms shown, but claim the right to vary therefrom within the intent of the claims.

Having thus described my invention, I claim as new and desire to secure by Letters Patent—

1. A bait-holder having a cylindrical body, and a removable end wall on said body, the body and end walls being formed of transparent material and all numerously perforated.

2. A bait-holder and fish-decoy, comprising a transparent bait-holder having a removable end wall that is perforated numerously, and means for supporting the holder at a proper depth in the water that game-fish pervade, so as to attract the fish and serve as a decoy when holding bait-fish.

In testimony whereof I have signed my name to this specification in the presence of two subscribing witnesses.

VICTOR LE BEAU.

Witnesses:
MAURICE PATRICK WOULFE,
JOSEPH BATSON NORRIS.